(12) United States Patent
Kobori et al.

(10) Patent No.: US 9,995,317 B2
(45) Date of Patent: Jun. 12, 2018

(54) RESERVOIR TANK

(71) Applicant: NISSIN KOGYO CO., LTD., Ueda, Nagano (JP)

(72) Inventors: Tetsuo Kobori, Nagano (JP); Motoyasu Nakamura, Nagano (JP)

(73) Assignee: AUTOLIV NISSIN BRAKE SYSTEMS JAPAN CO., LTD., Nagano (JP)

( * ) Notice: Subject to any disclaimer, the term of this patent is extended or adjusted under 35 U.S.C. 154(b) by 0 days. days.

(21) Appl. No.: 14/663,512

(22) Filed: Mar. 20, 2015

(65) Prior Publication Data

US 2015/0275926 A1    Oct. 1, 2015

(30) Foreign Application Priority Data

Mar. 27, 2014    (JP) ................................ 2014-066293

(51) Int. Cl.
    *F15B 1/26*        (2006.01)
    *B60T 11/26*      (2006.01)

(52) U.S. Cl.
    CPC ................ *F15B 1/26* (2013.01); *B60T 11/26* (2013.01); *F15B 2201/413* (2013.01)

(58) Field of Classification Search
    CPC . B60K 15/03177; B60K 15/03; B60K 15/077
    USPC .... 220/562, 563, 564, 4.13, 4.14, 4.15, 4.16
    See application file for complete search history.

(56) References Cited

U.S. PATENT DOCUMENTS

| | | | | |
|---|---|---|---|---|
| 4,805,668 A * | 2/1989 | Genter | ................... | B60T 11/26 137/558 |
| 5,141,179 A * | 8/1992 | Gautier | .................. | B64D 37/22 137/38 |
| 6,105,611 A * | 8/2000 | Ando | ...................... | B60T 11/26 137/558 |
| 7,261,123 B2 * | 8/2007 | Kim | ........................ | B60T 17/06 137/550 |

(Continued)

FOREIGN PATENT DOCUMENTS

| | | |
|---|---|---|
| CN | 201246351 | 5/2009 |
| CN | 102556028 | 7/2012 |
| EP | 1410968 A1 | 4/2004 |

(Continued)

OTHER PUBLICATIONS

European Search Report dated Dec. 21, 2015 in related EP Application No. 15160276.0, 7 pages.

(Continued)

*Primary Examiner* — Jeffrey Allen
(74) *Attorney, Agent, or Firm* — Andrew M. Calderon; Roberts Mlotkowski Safran Cole & Calderon, P.C.

(57) ABSTRACT

One embodiment provides a reservoir tank, including: a reservoir main body having a reserving chamber which reserves a hydraulic fluid, a hydraulic fluid pouring port which is provided at an upper portion of the reservoir main body, and a hydraulic fluid supply port which is provided at a lower portion of the reservoir main body. A groove-like recess portion is formed on a bottom surface of the reservoir main body. As in a projection in which the hydraulic fluid pouring port is projected onto a bottom surface side of the reservoir main body, the recess portion is disposed between the hydraulic fluid pouring port and the hydraulic fluid supply port.

18 Claims, 8 Drawing Sheets

(56) References Cited

U.S. PATENT DOCUMENTS

2003/0047990 A1    3/2003   Demersseman et al.

FOREIGN PATENT DOCUMENTS

| JP | S56146656 | 11/1981 |
| JP | H11020660 | 1/1999 |
| JP | 2003118560 | 4/2003 |
| JP | 2004106778 | 4/2004 |

OTHER PUBLICATIONS

Japanese Office Action for related JP Application No. 2014-066293 dated May 29, 2017, 9 pages.
Chinese Office Action for related CN Application No. 201510131980.3 dated Sep. 27, 2017, 14 pages.

* cited by examiner

RESERVOIR TANK

CROSS-REFERENCE TO RELATED APPLICATION(S)

This application claims priority from Japanese Patent Application No. 2014-066293 filed on Mar. 27, 2014, the entire contents of which are incorporated herein by reference.

FIELD

An embodiment described herein generally relates to a reservoir tank.

BACKGROUND

For example, JP-2004-106778-A discloses a reservoir tank is used for a master cylinder unit or a hydraulic control unit for a motor vehicle.

When used for a master cylinder unit, a reservoir tank is configured as a separate tank from the master cylinder unit, which supplies a hydraulic fluid to the master cylinder unit via a connecting hose or the like.

In the reservoir tank in JP-2004-106778-A, a filter is attached to a pouring port of a hydraulic fluid. In this reservoir tank, however, once foreign matters such as dust are allowed to enter the tank while the tank is maintained regularly as when filters are replaced, it has been difficult to trap the foreign matters in the tank.

SUMMARY

One object of the invention is to provide a reservoir tank which enables preferably the trapping of foreign matters even when the foreign matters are allowed to enter the tank.

The prevent invention at least provides configurations of following Aspects 1 to 8. Numerals etc. in the brackets indicate exemplary correspondence with the reference sings used in the embodiments.

1. A reservoir tank (1), including:
   a reservoir main body (3) having
   a reserving chamber (1a) which reserves a hydraulic fluid,
   a hydraulic fluid pouring port (2) which is provided at an upper portion of the reservoir main body (3), and
   a hydraulic fluid supply port (4, 4B) which is provided at a lower portion of the reservoir main body (3),
   wherein a groove-like recess portion (5, 60) is formed on a bottom surface (31a) of the reservoir main body (3), and
   wherein, as in a projection in which the hydraulic fluid pouring port (2) is projected onto a bottom surface (31a) side of the reservoir main body (3), the recess portion (5, 60) is disposed between the hydraulic fluid pouring port (2) and the hydraulic fluid supply port (4, 4B).
2. The reservoir tank (1) of Aspect 1,
   wherein the hydraulic fluid supply port (4) is formed at a lower portion of a side wall (33) of the reservoir main body (3), and
   wherein the recess portion (5) extends in a direction at right angles to a direction in which a nipple (41) of the hydraulic fluid supply port (4) extends.
3. The reservoir tank (1) of Aspect 1 or 2,
   wherein a bottom surface (54c) of the recess portion (5) has a slope of a downward gradient in a direction in which the bottom surface (31a) moves away from the hydraulic fluid supply port (4).
4. The reservoir tank (1) of Aspect 3,
   wherein a pair of the hydraulic fluid supply ports (4) is provided in parallel in the side wall (33), and
   wherein the slope is formed to extend along the downward gradient towards a middle portion (5a) between the pair of hydraulic fluid supply ports (4).
5. The reservoir tank (1) of anyone of Aspects 2 to 4,
   wherein a projecting portion (51) which projects downwards is provided on a lower surface (31b) of the reservoir main body (3), and the recess portion (60) is formed inside the projecting portion (5), and
   wherein, when placing the reservoir main body (3) on a flat resting plane (W1) such that the lower surface (31b) is brought into abutment with the resting plane (W1), the nipple (41) lies above a line which connects a portion of the projecting portion which is brought into abutment with the resting plane (W1) and the lower surface (31b) of the reservoir main body (3) or a portion of another projecting portion (36, 38) which projects from the lower surface (31b).
6. The reservoir tank (1) of anyone of Aspects 2 to 5,
   wherein a part (4a1) of the hydraulic fluid supply port (4) is positioned between the bottom surface (31a) of the reservoir main body (3) and the bottom surface (54a) of the recess portion (5).
7. The reservoir tank (1) of Aspect 1,
   wherein the hydraulic fluid supply port (4B) is formed in a bottom wall (31c) of the reservoir main body (3), and
   wherein the recess portion (60) is formed so as to surround the hydraulic fluid supply port (4B) as viewed from the top thereof.
8. The reservoir tank (1) of anyone of Aspects 1 to 7,
   wherein the reservoir main body (3) is configured as a separate tank which supplies a brake fluid to a master cylinder unit via a connecting hose (H) which is connected to the hydraulic fluid supply port (4, 4B).

According to Aspect 1, even though foreign matters enter the tank while the tank is maintained regularly as when filters are replaced, the foreign matters enter the recess portion in the process of the hydraulic fluid flowing from the hydraulic fluid pouring port to the hydraulic fluid supply port, whereby the foreign matters are trapped in the recess portion.

According to Aspect 2, since the recess portion extends in the direction at right angles to the direction in which the nipple extends, the foreign matters flowing towards the hydraulic fluid supply port can effectively trapped at an upstream side of the hydraulic fluid supply port.

According to Aspect 3, the foreign matters can be guided in the direction in which they move away from the hydraulic fluid supply port in the recess portion. Consequently, the foreign matters can effectively be trapped.

According to Aspect 4, the foreign matters can be collected altogether in the direction in which they move away from the pair of hydraulic fluid supply ports.

According to Aspect 5, since the recess portion is formed in the projecting portion, compared with a case where the recess portion is formed in a bottom portion of the reservoir main body, the thickness of the bottom portion can be reduced. Additionally, in placing the reservoir main body on the flat resting plane, the projecting portion functions as a supporting leg portion which supports the reservoir main body on the resting plane, whereby the nipple is prevented from being brought into contact with the resting plane. Consequently, the nipple can preferably be protected.

According to Aspect 6, since part of the hydraulic fluid supply port is disposed to be offset to lie further downwards than the bottom surface of the reservoir main body, the reservoir tank is obtained which is superior in supplying the hydraulic fluid.

According to Aspect 7, in the process of the hydraulic fluid flowing to the hydraulic fluid supply port formed in the bottom wall, the foreign matters enter the recess portion to be trapped in the recess portion.

According to Aspect 8, the arrangement of the reservoir tank within an engine compartment or the like can be enhanced.

According to the invention, the reservoir tank can be obtained which can preferably trap foreign matters even when the foreign matters enter the tank.

BRIEF DESCRIPTION OF DRAWINGS

FIGS. 11A to 11C illustrate a reservoir tank according to a second embodiment, in which

FIGS. 12A and 12B illustrate a modified example of the reservoir tank according to the second embodiment, of which

DETAILED DESCRIPTION

Hereinafter, embodiments will be described in detail by reference to the accompanying drawings. In the following description, same reference numerals will be given to same constituent elements so that similar descriptions are not repeated. When referred to herein, "front and/or rear," "left and/or right," and "up and/or down" indicate directions based on directions shown in FIG. 1.

First Embodiment

Figure 1:
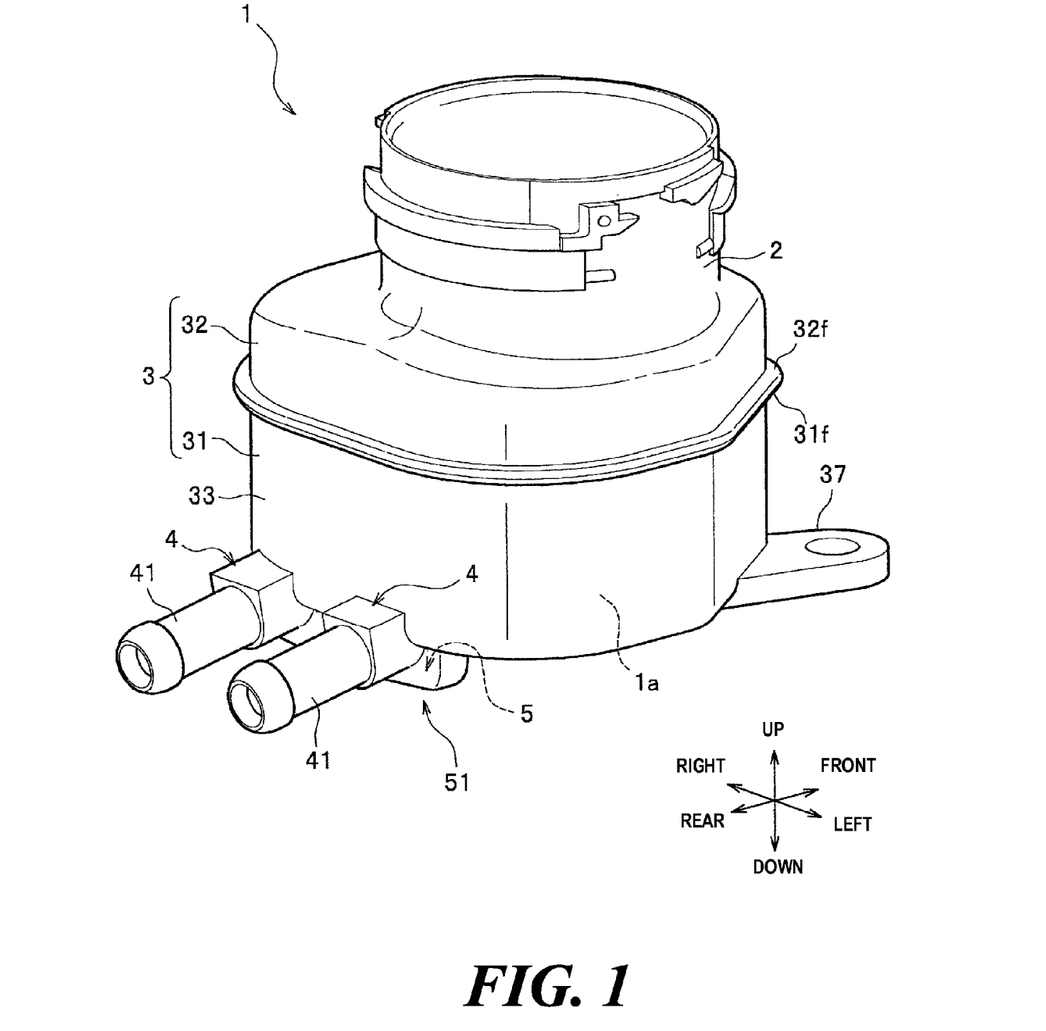
FIG. 1 is a perspective view of a reservoir tank according to a first embodiment as viewed obliquely downwards from a rear upper position thereof.

As shown in FIG. 1, a reservoir tank 1 of this embodiment is held by a bracket, not shown, of a vehicle. The bracket is supported on a side wall or the like of an engine compartment below a hood that gives access to the engine compartment. In the following description, the reservoir tank will be described as being connected to a master cylinder unit which is provided as part of a hydraulic control unit, this configuration is not intended to limit the application of the reservoir tank of the embodiment thereto.

For example, the master cylinder unit is attached to a dash panel which defines the engine compartment and a passenger compartment. A hydraulic fluid (a brake fluid) reserved in the reservoir tank 1 is supplied to the master cylinder unit by way of a connecting hose H (refer to FIG. 2, this will also be the case in the following description).

An engine and a transmission, which are not shown, or peripheral devices thereof, or an electric motor which replaces the engine are normally provided below the reservoir tank 1 in the engine compartment.

The reservoir tank 1 is configured as a separate tank which is separated from the master cylinder unit. The reservoir tank 1 is fixed to a bracket, not shown, via an attachment flange 37 and an attachment hook 38 (refer to FIGS. 2, 3) and is disposed in an attachment space via the bracket in the engine compartment.

As shown in FIG. 1, the reservoir tank 1 includes a reservoir main body 3 which includes, in turn, a hydraulic fluid pouring port 2 and a pair of hydraulic fluid supply ports 4, 4. The hydraulic fluid pouring port 2 is provided at an upper portion of the reservoir main body 3 and is closed with a cap, not shown. The hydraulic fluid supply ports 4, 4 are provided at a lower portion of the reservoir main body 3. A groove-like recess portion 5 is provided at the front of the hydraulic fluid supply ports 4, 4. The recess portion 5 is provided to communicate with the hydraulic fluid supply ports 4, 4. The reservoir main body 3 is made of hard resin.

As shown in FIGS. 1 to 4, the reservoir main body 3 is made up of a lower half member 31 and an upper half member 32. An interior of the reservoir main body 3 is formed into a reserving chamber 1a which reserves a hydraulic fluid. The lower half member 31 and the upper half member 32 are joined together in a fluid tight fashion by fusing flanges 31f, 32f together which are formed along facing edges of the lower and upper half members as shown in FIG. 1.

Figure 5:
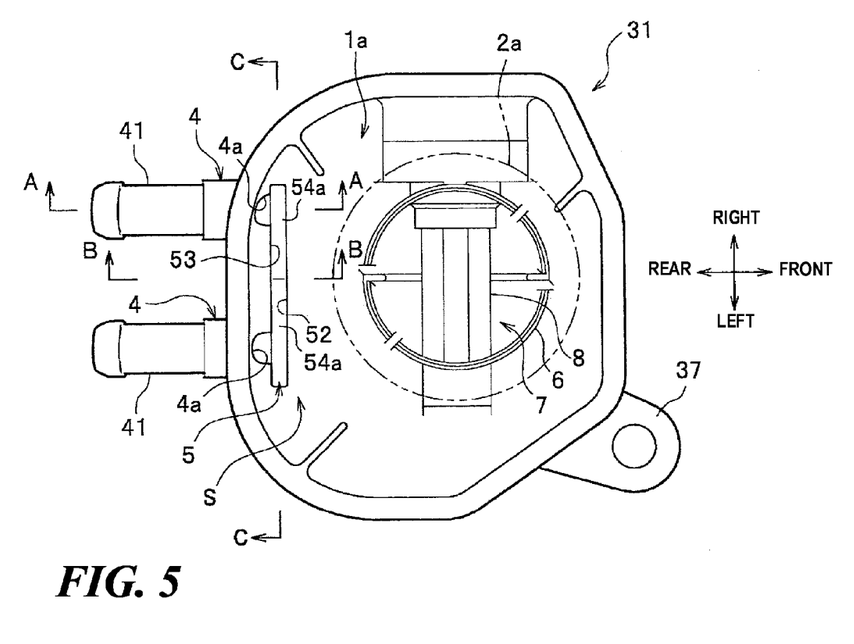
FIG. 5 is a plan view showing a lower half member of the same reservoir tank.

As shown in FIG. 5, a substantially cylindrical float guide 6 is provided substantially at a central portion of the lower half member 31 so as to be erected therefrom. A float chamber 7 is formed inside the float guide 6.

A fluid level detection device, not shown, is provided in the float chamber 7. The fluid level detection device detects that an amount of brake fluid in the reservoir main body 3 reaches a lowest level of a proper reserving range of brake fluid therein (an abnormal level of brake fluid in the reservoir main body 3). The detection device includes a float, not shown, and a detector 8.

The float is made of a light material such as a foamed resin material and moves up or down (rises or falls) in the float chamber 7 as the fluid level of the brake fluid in the reservoir main body 3 changes.

The detector 8 detects that the float falls to a prescribed position. A reed switch or the like, not shown, is provided in an interior of the detector 8. The reed switch is activated to operate when the float falls and the amount of brake fluid in the reservoir main body 3 reaches the lowest level of the proper range of brake fluid therein. An abnormal level of brake fluid in the reservoir tank 1 is detected by the reed switch.

The hydraulic fluid supply ports 4, 4 are provided in parallel in a lower portion of a side wall 33 which constitutes a rear end lower portion of the lower half member 31. The hydraulic fluid supply ports 4, 4 are provided in parallel in such a state that they are spaced apart from each other in a left-to-right direction. Straight tubular nipples 41 are provided integrally on the individual hydraulic fluid supply ports 4, 4. Each nipple includes a hose joint portion to which the connecting hose H is connected. Each nipple 41 is inclined with a downward gradient towards the rear of the reservoir main body 3 (towards a distal end of the nipple 41).

Figure 6:
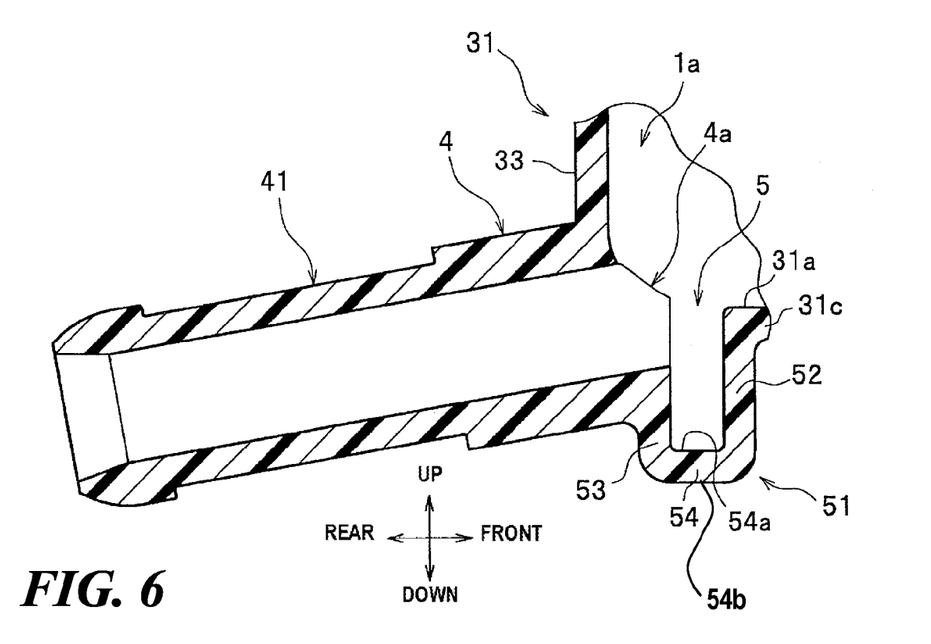
FIG. 6 is a sectional view taken along a section line A-A in FIG. 5.
Figure 8:
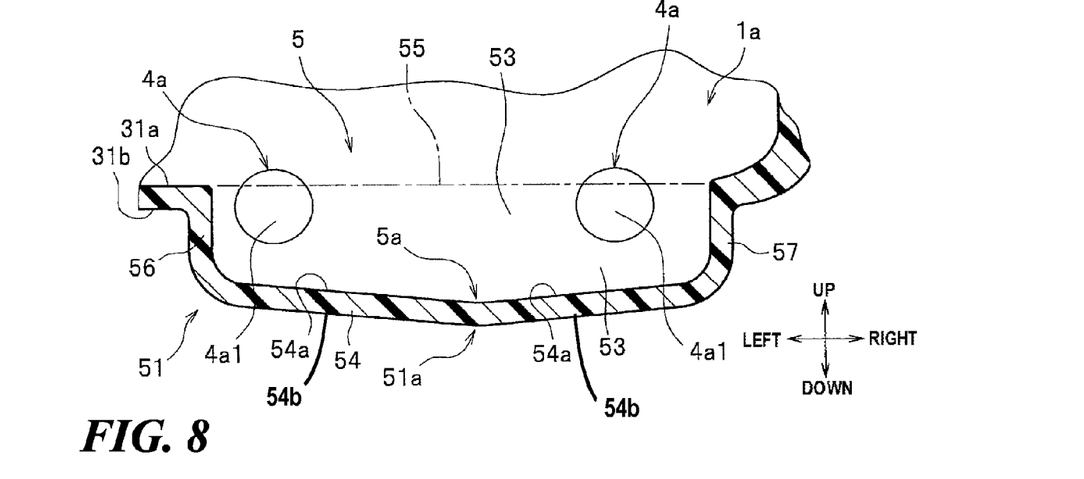
FIG. 8 is a sectional view taken along a section line C-C in FIG. 5.

As shown in FIG. 5, the hydraulic fluid supply ports 4, 4 communicate with an interior of the reserving chamber 1*a* through opening portions 4*a*, 4*a*. As shown in FIG. 8, lower portions 4*a*1, 4*a*1 of the opening portions 4*a*, 4*a* open to a position between a bottom surface 31*a* of the reservoir main body 3 and a bottom surface 54*a* of the recess portion 5 (lower than a boundary portion 55 (a boundary indicated by an alternate long and short dash line). Thus, the opening portions 4*a*, 4*a* are formed to open from the side wall 33 of the lower half member 31 to a rear wall 53 of the recess portion 5 as shown in FIG. 6. Namely, the hydraulic fluid supply ports 4, 4 are provided in a corner portion between the side wall 33 and the recess portion 5 (a bottom wall 31*c*). The opening portions 4*a*, 4*a* are provided in a position which deviates further downwards than the bottom surface 31*a* of the lower half member 31 by making use of the rear wall 53 of a projecting portion 51 which projects downwards from a lower surface 31*b* of the lower half member 31.

As shown in FIG. 5, the recess portion 5 is formed in the bottom surface 31*a* of the lower half member 31. As in a projection drawing in which an inner circumferential surface 2*a* (indicated by a chain double-dashed line in the figure) of the hydraulic fluid pouring port 2 is projected onto the bottom surface 31*a*, the recess portion 5 is disposed in a space S which is defined between the hydraulic fluid pouring port 2 (the inner circumferential surface 2*a*) and the hydraulic fluid supply ports 4, 4 (the opening portions 4*a*, 4*a*).

Figure 7:
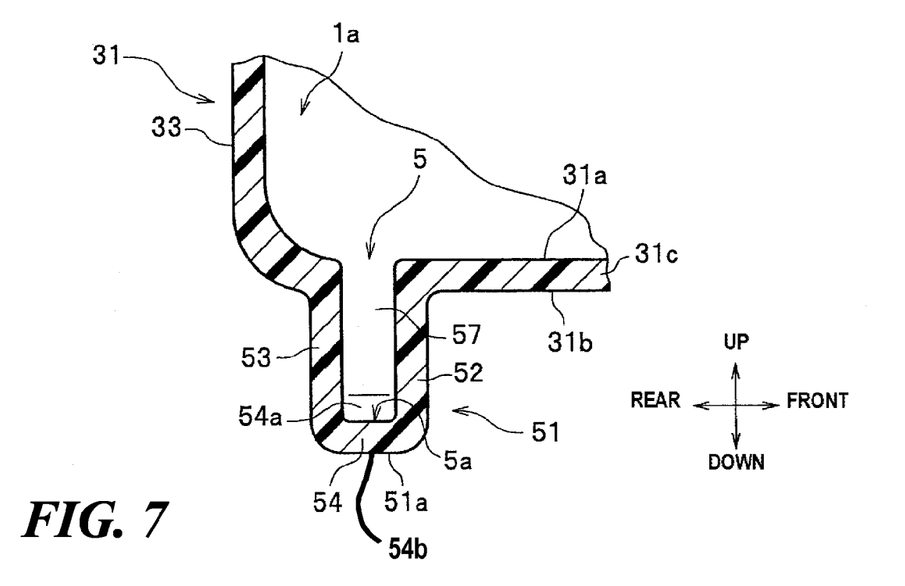
FIG. 7 is a sectional view taken along a section line B-B in FIG. 5.

The recess portion 5 extends in a left-to-right direction of the bottom surface 31*a*. As shown in FIGS. 6, 7, the recess portion 5 is formed inside (in an inner space of) the projecting portion 51. The projecting portion 51 is formed to project downwards integrally from the lower surface 31*b* of the lower half member 31. The projecting portion 51 has a front wall 52, the rear wall 53, a bottom wall 54, a left wall 56 and a right wall 57.

The front wall 52 and the rear wall 53 are suspended downwards of the lower surface 31*b*. The front wall 52 and the rear wall 53 are disposed substantially parallel to each other with a space defined therebetween in a front-to-rear direction and extend in a direction which is substantially at right angles to a direction in which the nipples 41, 41 extend. Namely, the recess portion 5 is a groove which extends in the direction which is substantially at right angles to the direction in which the nipples 41, 41 extend.

As shown in FIG. 8, part (lower portions 4*a*1, 4*a*1) of the opening portions 4*a*, 4*a* is opened. The rear wall 53 is made up of a portion which lies lower than the boundary portion 55 (the boundary).

As shown in FIGS. 6, 7, the bottom wall 54 connects a lower end of the front wall 52 and a lower end of the rear wall 53. As shown in FIG. 8, a bottom surface 54*a* of the bottom wall 54 is inclined with a downward gradient towards a middle portion 5*a* between the hydraulic fluid supply ports 4, 4 (between the opening portions 4*a*, 4*a*). Namely, the slope of a downward gradient is formed below the pair of opening portions 4*a*, 4*a* which extends towards a longitudinal central portion of the recess portion 5 (in a direction in which the slope moves away from the pair of opening portions 4*a*, 4*a*).

A lower surface 54*b* of the bottom wall 54 is formed into a slope of a downward gradient which follows the gradient of the bottom surface 54*a*, extending downwards to a lower end portion 51*a* which constitutes a transverse central portion.

Figure 2:
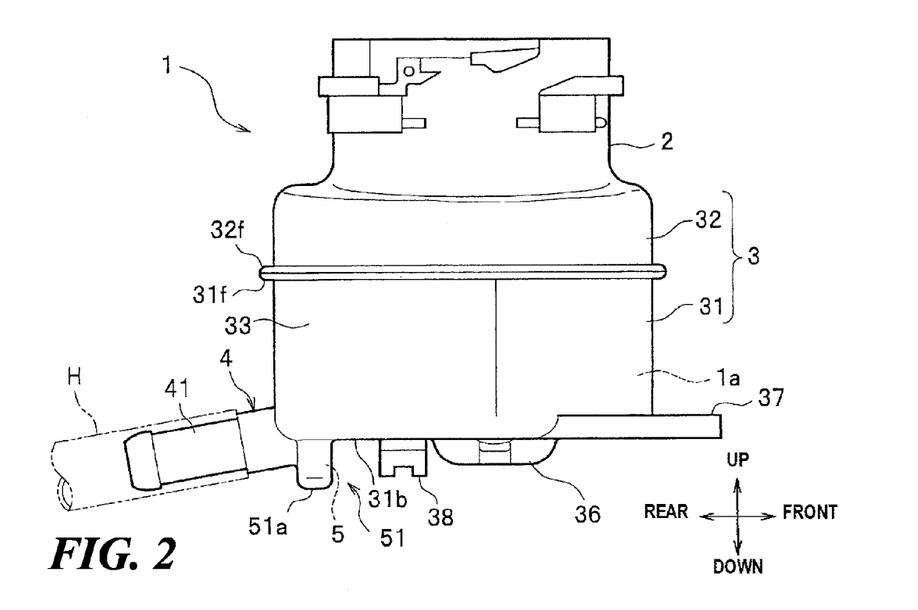
FIG. 2 is a left side view of the same reservoir tank.
Figure 3:
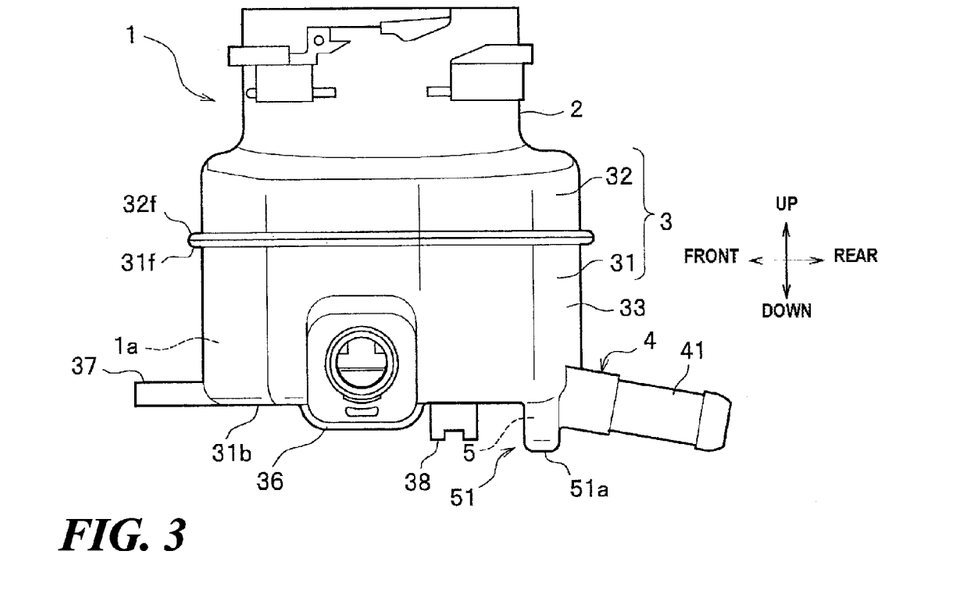
FIG. 3 is a right side view of the same reservoir tank.
Figure 4:
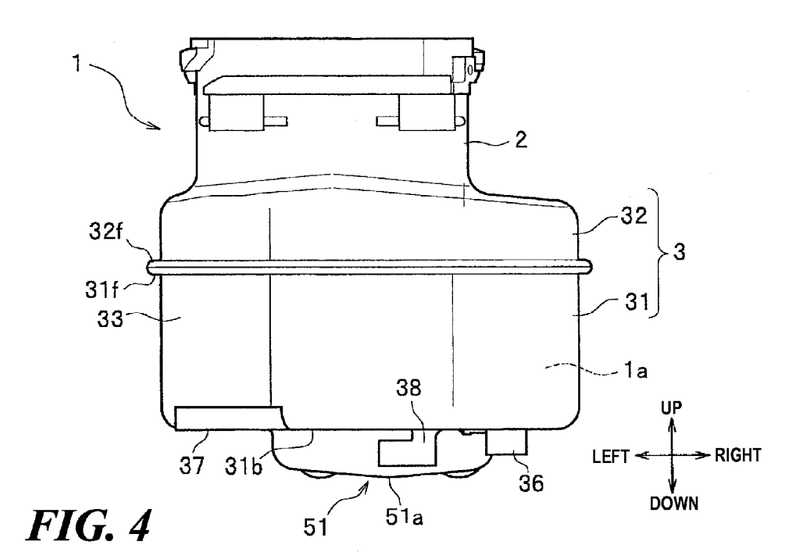
FIG. 4 is a front view of the same reservoir tank.

As shown in FIGS. 2, 3, the projecting portion 51 projects further downwards than other projecting portions (a connector portion 36, the attachment 38 and the like) which are provided on the lower surface 31*b*.

Figure 9:
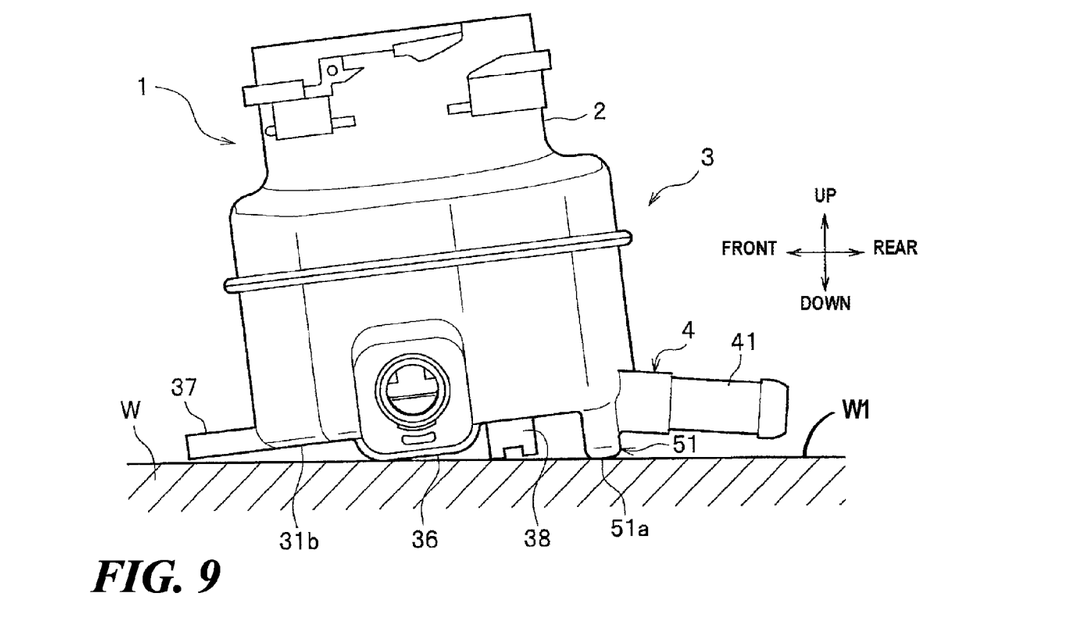
FIG. 9 is a left side view of the reservoir tank showing a state in which the reservoir tank is placed on a working table.

For example, as shown in FIG. 9, when the reservoir main body 3 is placed on a flat resting plane W1 such as a working table W, a lower end portion 51*a* of the projecting portion 51 is brought into abutment with the resting plane W1. This causes the projecting portion 51 to function as a supporting leg portion which supports the reservoir main body 3 on the resting plane W1.

In the resting state like this, the nipples 41 are positioned further upwards than a line (a line superposed on the resting plane W1) which connects a portion where the projecting portion 51 is brought into abutment with the resting plane W1 with portions where the other projecting portions are brought into abutment with the resting plane W1.

This can prevent the nipples 41 from being brought into contact with the resting plane W1.

Next, referring to FIGS. 10A and 10B, a function of the reservoir tank 1 will be described which is exhibited when foreign matters G enter the reserving chamber 1*a* from the hydraulic fluid pouring port 2.

For example, in case foreign matters G enter the interior of the reserving chamber 1*a* from the hydraulic fluid pouring port 2 (refer to FIG. 1) while filters, not shown, are being replaced, the foreign matters G settle down towards the bottom surface 31*a* of the reserving chamber 1*a* and are then carried gradually towards the hydraulic fluid supply ports 4, 4 which lie downstream by the flow of hydraulic fluid.

Figure 10A:
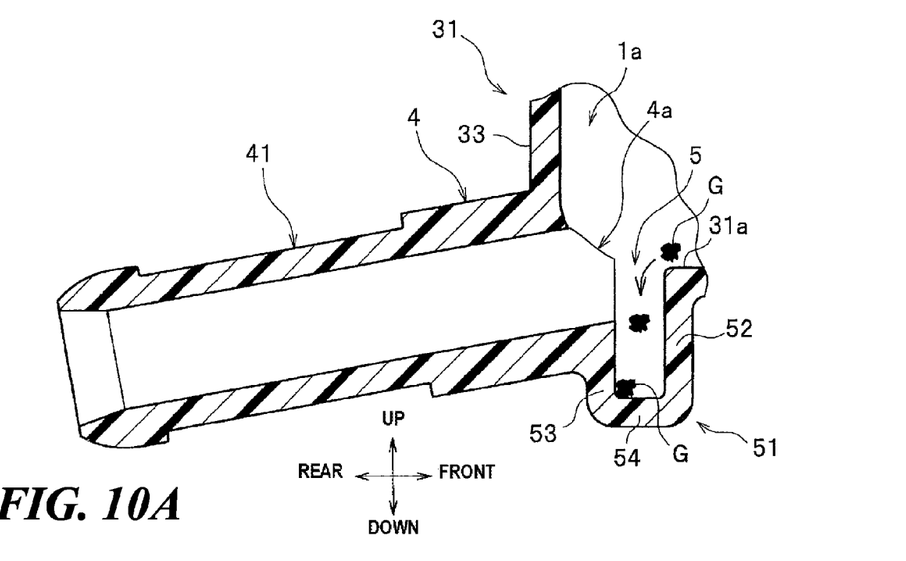
FIGS. 10A and 10B illustrate a function of the reservoir tank which it exhibits when foreign matters enter the reservoir tank.

Then, the foreign matters G are carried to an inner side of an opening edge of the recess portion 5 by the flow of hydraulic fluid directed towards the hydraulic fluid supply ports 4, 4, whereupon the foreign matters G fall into the recess portion 5 to settle down towards the bottom surface 54*a* as shown in FIG. 10A.

Figure 10B:
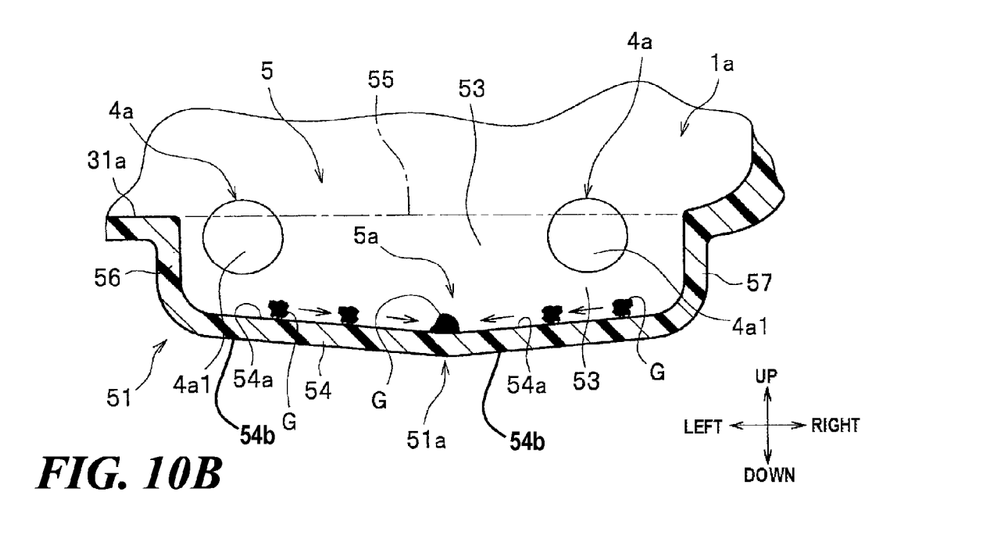

Here, as shown in FIG. 10B, since the bottom surface 54*a* of the recess portion 5 is inclined with a downward gradient towards the middle portion 5*a* between the hydraulic fluid supply ports 4, 4 (between the opening portions 4*a*, 4*a*), the foreign matters G that have settled down on the bottom surface 54*a* move towards the middle portion 5*a* on the bottom surface 54*a*.

This collects the foreign matters G to the periphery of the middle portion 5*a* of the bottom surface 54 which is positioned away from both the opening portions 4*a*, 4*a*.

The recess portion 5 extends in the direction which is substantially at right angles to the direction in which the nipples 41 extend, and hence, the foreign matters G settle downwards in the recess portion 5 in the direction which is substantially at right angles to the direction in which the hydraulic fluid flows. Thus, it is difficult for the foreign matters G to be affected by the flow of hydraulic fluid, and the foreign matters G are preferably caused to stay within the recess portion 5. Consequently, there is no risk of the foreign matters G which are trapped in the recess portion 5 flowing out into the hydraulic fluid supply ports 4, 4 through the opening portions 4*a*, 4*a*. This can preferably prevent the foreign matters G from flowing into the master cylinder unit which lies downstream of the reservoir tank 1.

According to the reservoir tank 1 of this embodiment which has been described heretofore, even in case the foreign matters G enter the reserving chamber 1*a* while the reservoir tank 1 is maintained regularly as when filters are replaced, the foreign matters G enter the recess portion 5 in the process of the hydraulic fluid flowing from the hydraulic fluid pouring port 2 to the hydraulic fluid supply ports 4, 4, whereby the foreign matters G are trapped in the recess portion 5.

Since the recess portion 5 extends in the direction which is at right angles to the direction in which the nipples 41 extend, the foreign matters G which flows towards the hydraulic fluid supply ports 4, 4 can be trapped effectively upstream of the hydraulic fluid supply ports 4, 4.

The bottom surface 54a of the recess portion 5 has the slope of a downward gradient which extends in the direction in which it moves away from the hydraulic fluid supply ports 4, 4, and therefore, the foreign matters G can be guided in the direction in which they move away from both the hydraulic fluid supply ports 4, 4 in the recess portion 5. Consequently, the foreign matters G can be trapped effectively.

In addition, the bottom surface 54a of the recess portion 5 is formed into the slope of a downward gradient which extends towards the middle portion 5a between the pair of hydraulic fluid supply ports 4, 4, and therefore, the foreign matters G can be collected altogether in the direction in which they move away from the pair of hydraulic fluid supply ports 4, 4.

The recess portion 5 is formed in the projecting portion 51 which projects from the lower surface 31b of the reservoir main body 3, and therefore, compared with a case where the recess portion 5 is formed in the bottom wall 31c of the reservoir main body 3, the thickness of the bottom wall 31c can be reduced. In addition, the projecting portion 51 projects further downwards than the nipples 41, and therefore, in placing the reservoir main body 3 on the resting plane W1 of the working table W, the projecting portion 51 functions as the supporting leg portion which supports the reservoir main body 3 on the resting plane W1, whereby the contact of the nipples 41 with the resting plane W1 is prevented. Consequently, the nipples 41 can preferably be protected.

The lower portions 4a1, 4a1 of the opening portions 4a, 4a are positioned between the bottom surface 31a of the reservoir main body 3 and the bottom surface 54a of the recess portion 5, and the opening portions 4a, 4a are disposed to be offset further downwards than the bottom surface 31a. Thus, the reservoir tank 1 is obtained which is superior in supplying the hydraulic fluid.

The reservoir main body 3 is configured as the separate tank which supplies the brake fluid to the master cylinder unit via the connecting hoses H which are connected to the hydraulic fluid supply ports 4, and therefore, the arrangement of the reservoir tank 1 in the engine compartment can be enhanced.

Second Embodiment

Figure 11A:
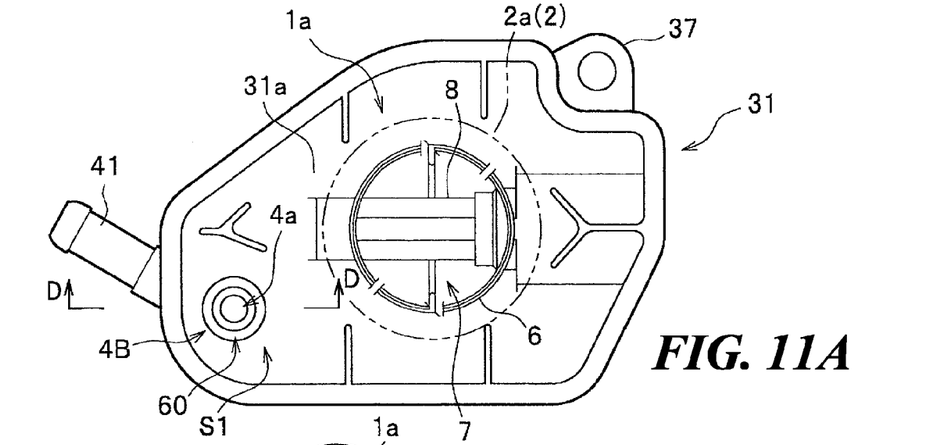
FIG. 11A is a plan view of a lower half member of the reservoir tank.
Figure 11B:
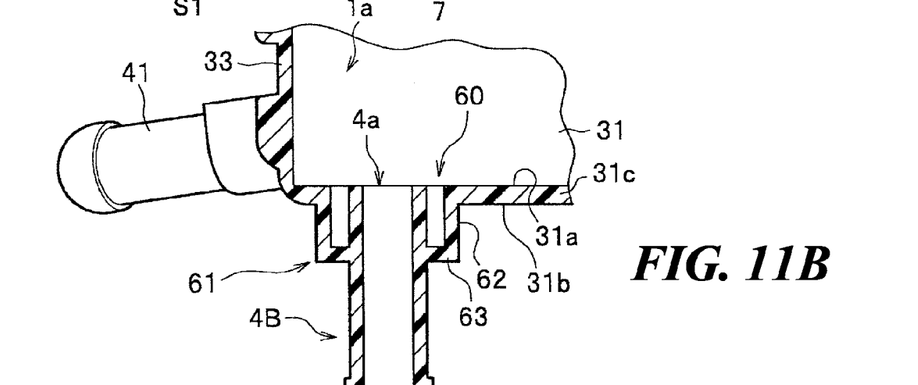
FIG. 11B is a sectional view taken along a section line D-D in FIG. 11A.
Figure 11C:
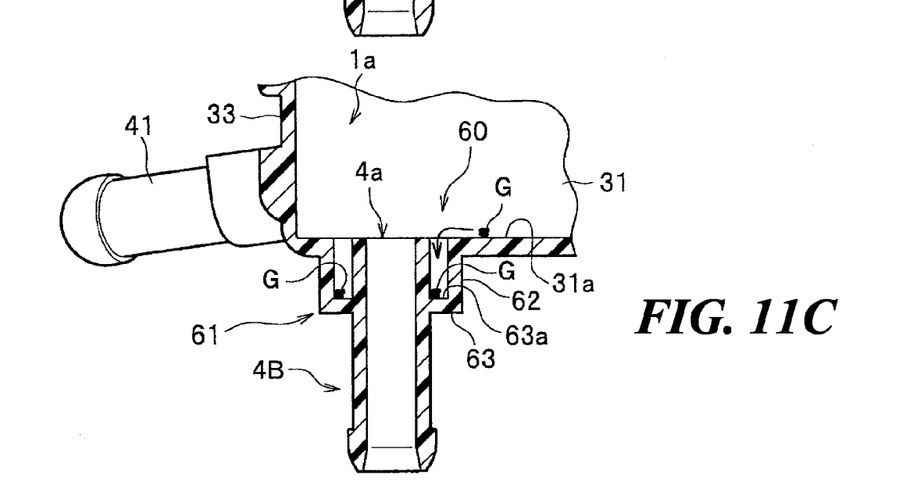
FIG. 11C is a view illustrating the function of the reservoir tank.

Referring to FIGS. 11A to 11C, a reservoir tank 1 of a second embodiment will be described. The second embodiment differs from the first embodiment in that a recess portion 60 is provided in a hydraulic fluid supply port 4B which is provided in a bottom wall 31c of a lower half member 31. The hydraulic fluid supply port 4B includes a hose joint portion which is provided integrally thereon.

As shown in FIG. 11A, as viewed from thereabove, the recess portion 60 is formed into a cylindrical opening which surrounds an opening portion 4a of the hydraulic fluid supply port 4B which is provided in a bottom surface 31a. In a projection in which an inner circumferential surface 2a (indicated by a chain double-dashed line in FIG. 11A) of a hydraulic fluid pouring port 2 is projected onto the bottom surface 31a, the recess portion 60 is disposed in a space S1 which is defined between the hydraulic fluid pouring port 2 (the inner circumferential surface 2a) and the hydraulic fluid supply port 4B (the opening portion 4a).

As shown in FIG. 11B, the recess portion 60 is formed inside a projecting portion 61 which is formed to project integrally from a lower surface 31b of a lower half member 31. The projecting portion 61 is formed into a bottomed cylindrical shape and is provided so as to surround an outer circumferential surface of an upper portion of the hydraulic fluid supply port 4B from a radially outer side. The projecting portion 61 has a cylindrical body barrel portion 62, and a bottom portion 63 which continues to a lower end of the barrel portion 62. A radially inner portion of the bottom portion 63 is connected integrally to the outer circumferential surface of the upper portion of the hydraulic fluid supply port 4B. The projecting portion 61 functions as a supporting member which supports the hydraulic fluid supply port 4B, and the hydraulic fluid supply port 4B is supported by the lower half member 31 via the projecting portion 61.

As shown in FIG. 11A, a nipple 41 is provided on a side wall 33 of the lower half member 31. As viewed from thereabove, the nipple 41 is connected to the side wall 33 at a certain angle. In this embodiment, the recess portion 60 is positioned on an extension of the nipple 41 in a direction in which it extends.

Next, referring to FIG. 11C, a function of the reservoir tank 1 will be described which is exhibited when foreign matters G enter a reserving chamber 1a from the hydraulic fluid pouring port 2.

For example, in case foreign matters G enter the interior of the reserving chamber 1a from the hydraulic fluid pouring port 2 while filters, not shown, are being replaced, the foreign matters G settle down towards the bottom surface 31a of the reserving chamber 1a and are then carried gradually towards the hydraulic fluid supply port 4B which lies downstream by the flow of hydraulic fluid.

Then, the foreign matters G are carried to an inner side of an opening edge of the recess portion 60 by the flow of hydraulic fluid directed towards the hydraulic fluid supply port 4B, whereupon the foreign matters G fall into the recess portion 60 to settle down towards a bottom surface 63a. Here, since the recess portion 60 opens into an annular shape, even though the foreign matters G move to the recess portion 60 from any direction around the opening, the foreign matters G can be trapped in the recess portion 60.

The recess portion 60 extends downwards in a direction which is substantially at right angles to the flowing direction of the hydraulic fluid which is directed towards the opening portion 4a of the hydraulic fluid supply port 4B. Therefore, it is difficult for the foreign matters G which are trapped by the recess portion 60 to be affected by the flow of hydraulic fluid, whereby the foreign matters G are preferably caused to stay in the recess portion 60. Consequently, there is no risk of the foreign matters G which are trapped in the recess portion 60 flowing out into the hydraulic fluid supply port 4B.

According to the reservoir tank 1 of this embodiment which has been described heretofore, since the recess portion 60 is formed so as to surround the hydraulic fluid supply port 4B as viewed from thereabove, the foreign matters G enter the recess portion 60 in the process of the hydraulic fluid flowing to the hydraulic fluid supply port 4B which is formed in the bottom wall 31c, whereby the foreign matters G are trapped in the recess portion 60.

Consequently, the foreign matters G can be prevented from entering the master cylinder unit which is disposed downstream of the reservoir tank 1.

Since the recess portion 60 is positioned on the extension of the nipple 41 in the direction in which it extends, even though the foreign matters G are mixed into the hydraulic fluid directed towards the nipple 41, the foreign matters G can preferably be trapped by the recess portion 60.

Modification of Second Embodiment

Figure 12A:
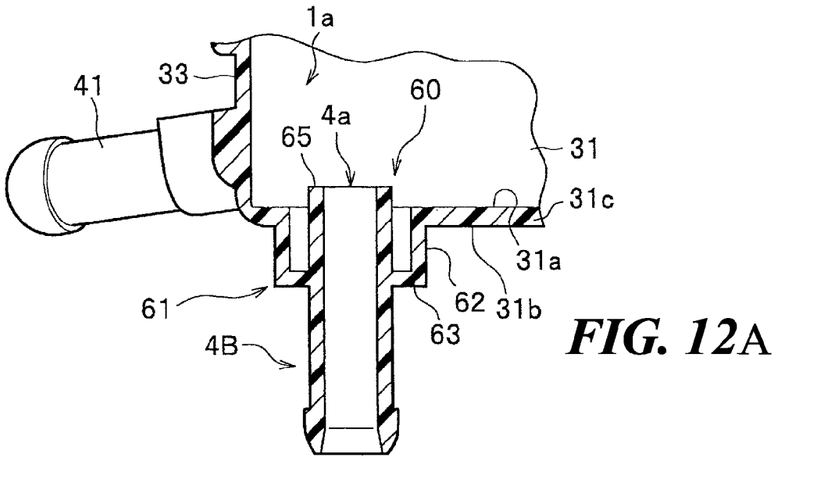
FIG. 12A is an enlarged sectional view showing the periphery of a hydraulic fluid supply port and FIG. 12B is a view showing the function thereof.

FIG. 12A shows a modified example of the second embodiment. In this modified example, an upper end portion 65 of a hydraulic fluid supply port 4B projects further upwards than a bottom surface 31a of a lower half member 31.

Figure 12B:
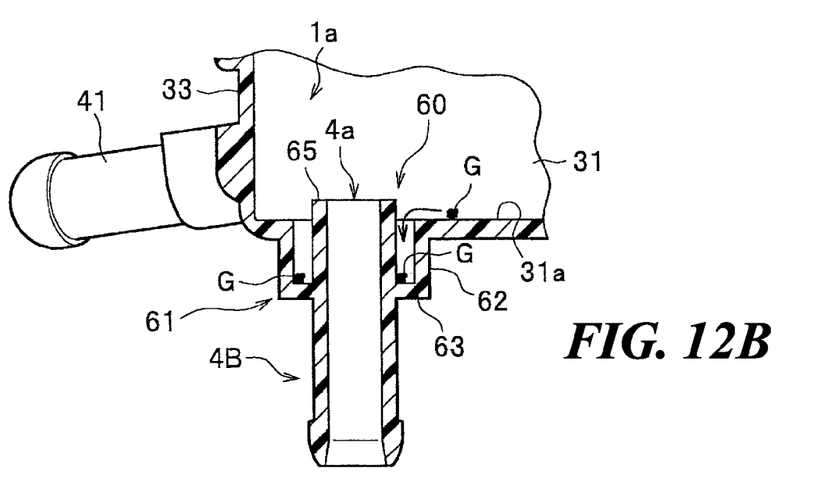

In this modified example, as shown in FIG. 12B, the upper end portion 65 constitutes a resistance against a flow of hydraulic fluid which is directed towards an opening portion 4a of the hydraulic fluid supply port 4B. As a result of this, foreign matters easily fall into a recess portion 60. Consequently, the foreign matters G can preferably be trapped in the recess portion 60.

A configuration may be adopted in which one or a plurality of vertically extending slits are formed in the upper end portion 65 so that the hydraulic fluid flows into the hydraulic fluid supply port 4B through these slits.

Additionally, a configuration may be adopted in which the recess portion 5 of the first embodiment is provided just before (in a position lying upstream of) the nipple 41.

In the first embodiment described above, although the recess portion 5 has a substantially rectangular cross section, the invention is not limited thereto, and hence, the recess portion 5 may have various cross sectional shapes including a substantially triangular shape, an arc-like shape and the like, provided that a shape adopted can trap foreign matters G therein.

In the first embodiment described above, although the opening portions 4a, 4a of the hydraulic fluid supply ports 4, 4 are described as being provided between the lower portion of the side wall 33 and the rear wall 53 of the recess portion 5, the invention is not limited thereto, and hence, the opening portions 4a, 4a may be provided only in the side wall 33 or the rear wall 53.

In the first embodiment described above, although the single recess portion 5 is provided in the space S, a plurality of recess portions may be provided therein. Alternatively, a plurality of slit-like grooves may be provided continuously in place of the recess portion 5. Further, in the second embodiment, although the single recess portion 60 is provided in the space S1, a plurality of recess portions may be provided into a configuration of concentric rings.

The invention claimed is:

1. A reservoir tank, including:
a reservoir main body having
a reserving chamber which reserves a hydraulic fluid,
a hydraulic fluid pouring port which is provided at an upper portion of the reservoir main body, and
a hydraulic fluid supply port which is provided at a lower portion of the reservoir main body, a bottom surface of a recess portion being located more downwards than a bottom surface of the reservoir main body,
wherein the recess portion is formed on a bottom surface of the reservoir main body and comprises at least a downwardly suspended front wall and rear wall which are substantially parallel to each other with a space defined therebetween, and
wherein, as in a projection in which the hydraulic fluid pouring port is projected onto a bottom surface side of the reservoir main body, the recess portion is disposed between the hydraulic fluid pouring port and the hydraulic fluid supply port, and
wherein a portion defining an opening of the hydraulic fluid supply port is adjacent to at least one of a side wall of the reservoir main body and the rear wall of the recess portion,
wherein the hydraulic fluid supply port is formed at both a lower portion of the side wall of the reservoir main body and an upper portion of the recess rear wall of the portion on the bottom surface of the reservoir main body, and
wherein the recess portion extends in a direction different than a direction in which a nipple of the hydraulic fluid supply port extends.

2. The reservoir tank of claim 1,
wherein the bottom surface of the recess portion has a slope of a downward gradient in a direction in which the bottom surface moves away from the hydraulic fluid supply port.

3. The reservoir tank of claim 2,
wherein a pair of the hydraulic fluid supply ports is provided in parallel in the side wall, and
wherein the slope is formed to extend along the downward gradient towards a middle portion between the pair of hydraulic fluid supply ports.

4. The reservoir tank of claim 1,
wherein a projecting portion which projects downwards is provided on a lower surface of the reservoir main body, and the recess portion is formed inside the projecting portion, and
wherein, when placing the reservoir main body on a flat resting plane such that the lower surface is brought into abutment with the resting plane, the nipple lies above a line which connects a portion of the projecting portion which is brought into abutment with the resting plane and the lower surface of the reservoir main body or a portion of another projecting portion which projects from the lower surface.

5. The reservoir tank of claim 1,
wherein a part of the hydraulic fluid supply port is positioned between the bottom surface of the reservoir main body and the bottom surface of the recess portion.

6. The reservoir tank of claim 1,
wherein the reservoir main body is a separate tank which supplies a brake fluid to a master cylinder unit via a connecting hose which is connected to the hydraulic fluid supply port.

7. The reservoir tank of claim 1, further comprising:
a pair of hydraulic fluid supply ports provided in parallel in the lower portion of the side wall which constitutes a rear end lower portion of a lower half member, and
wherein the pair of hydraulic fluid supply ports are spaced apart from each other in a left-to-right direction.

8. The reservoir tank of claim 7, further comprising straight tubular nipples provided integrally on each of the pair of hydraulic fluid supply ports,
wherein each nipple includes a hose joint portion, and
wherein each nipple is inclined with a downward gradient towards a rear of the reservoir main body, towards a distal end of the nipple.

9. The reservoir tank of claim 8,
wherein the pair of hydraulic fluid supply ports communicate with an interior of the reserving chamber through opening portions,
wherein lower portions of the opening portions open to a position between the bottom surface of the reservoir main body and a bottom surface of the recess portion such that the opening portions are formed to open from the sidewall of the lower half member to a rear wall of the recess portion, and
wherein the pair of hydraulic fluid supply ports are provided in a corner portion between the sidewall and the recess portion and the opening portions are provided in a position which deviates further downwards than the bottom surface of the reservoir main body by making use of a rear wall of a projecting portion which projects downwards from a lower surface of the lower half member.

10. The reservoir tank of claim 1,
wherein the recess portion is only disposed in a space which is defined between an inner circumferential surface of the hydraulic fluid pouring port and opening portions of a pair of hydraulic fluid supply ports.

11. The reservoir tank of claim 1,
wherein the recess portion is formed in an inner space of a projecting portion,
wherein the projecting portion is formed to project downwards integrally from a lower surface of the lower half member,
wherein the projecting portion has a front wall, a rear wall, a bottom wall, a left wall and a right wall,
wherein the front wall and the rear wall are suspended downwards of another lower surface of the lower half member, and
wherein the front wall and the rear wall are disposed substantially parallel to each other with a space defined therebetween in a front-to-rear direction and extend in a direction which is substantially at right angles to a direction in which nipples of the hydraulic fluid supply port extends.

12. The reservoir tank of claim 11,
wherein a bottom surface of the bottom wall is inclined with a downward gradient towards a middle portion between the pair of hydraulic fluid supply ports, between opening portions of a pair of hydraulic fluid supply ports.

13. The reservoir tank of claim 11,
wherein a lower surface of the bottom wall is formed into a slope of a downward gradient which follows a gradient of the bottom surface, extending downwards to a lower end portion which constitutes a transverse central portion.

14. A reservoir tank, including:
a reservoir main body having
 a reserving chamber which reserves a hydraulic fluid,
 a hydraulic fluid pouring port which is provided at an upper portion of the reservoir main body, and
 a hydraulic fluid supply port which is provided at a lower portion of the reservoir main body,
wherein a groove-like recess portion is formed on a bottom surface of the reservoir main body, and
wherein, as in a projection in which the hydraulic fluid pouring port is projected onto a bottom surface side of the reservoir main body, the recess portion is outwardly disposed from an inner circumferential surface of the hydraulic fluid pouring port and between the hydraulic fluid pouring port and the hydraulic fluid supply port,
wherein the recess portion is formed into a cylindrical opening of a projecting portion suspended from a bottom surface of the reserving chamber, which surrounds an opening portion of the hydraulic fluid supply port which is provided in a bottom surface of the lower portion of the reservoir main body,
wherein the recess portion is formed inside the projecting portion which is formed to project integrally from a lower surface of a lower half member of the lower portion, and
wherein the projecting portion is formed into a bottomed cylindrical shape and is provided so as to surround an outer circumferential surface of an upper portion of the hydraulic fluid supply port from a radially outer side.

15. The reservoir tank of claim 14,
wherein the projecting portion has a cylindrical body barrel portion, and a bottom portion which continues to a lower end of the barrel portion, and
wherein a radially inner portion of the bottom portion is connected integrally to the outer circumferential surface of the upper portion of the hydraulic fluid supply port.

16. The reservoir tank of claim 14,
wherein the recess portion is defined by a projection that extends above the bottom surface of the lower half member.

17. The reservoir tank of claim 1,
the recess portion is disposed offset from the hydraulic fluid pouring port in a top down view and extends from a circumferential sidewall of the hydraulic fluid supply port, away from a bottom surface of the of the recess.

18. The reservoir tank of claim 14,
wherein a pair of the hydraulic fluid supply ports is provided at the lower portion of the reservoir main body, and
wherein a lower surface of the recess has a slope extending downward from each hydraulic fluid supply port to meet each other.

\* \* \* \* \*